(12) United States Patent
Rosenberger et al.

(10) Patent No.: US 12,730,258 B2
(45) Date of Patent: Sep. 8, 2026

(54) ANTI-RESONANT OPTICAL COMPONENT AND METHOD FOR THE PRODUCTION OF SAME

(71) Applicant: Heraeus Quarzglas GmbH & Co. KG, Hanau (DE)

(72) Inventors: Manuel Rosenberger, Hanau (DE); Jaqueline Plass, Hanau (DE)

(73) Assignee: HERAEUS QUARZGLAS GMBH & CO. KG, Hanau (DE)

( * ) Notice: Subject to any disclaimer, the term of this patent is extended or adjusted under 35 U.S.C. 154(b) by 297 days.

(21) Appl. No.: 18/261,776

(22) PCT Filed: Jan. 5, 2022

(86) PCT No.: PCT/EP2022/050110
§ 371 (c)(1),
(2) Date: Jul. 17, 2023

(87) PCT Pub. No.: WO2022/157010
PCT Pub. Date: Jul. 28, 2022

(65) Prior Publication Data

US 2024/0295689 A1 Sep. 5, 2024

(30) Foreign Application Priority Data

Jan. 19, 2021 (EP) .................................... 21152376

(51) Int. Cl.
*G02B 6/02* (2006.01)
*C03B 37/012* (2006.01)
(Continued)

(52) U.S. Cl.
CPC ...... *G02B 6/02328* (2013.01); *C03B 37/0122* (2013.01); *C03B 37/02781* (2013.01); *G02B 6/032* (2013.01); *C03B 2203/16* (2013.01)

(58) Field of Classification Search
None
See application file for complete search history.

(56) References Cited

U.S. PATENT DOCUMENTS 9,810,837 B2 11/2017 Benabid et al.
2016/0124144 A1 5/2016 Benabid et al.
(Continued)

FOREIGN PATENT DOCUMENTS

CN 107797175 A 3/2018
CN 111474627 A 7/2020
(Continued)

OTHER PUBLICATIONS

Poletti,F., "Nested antiresonant nodeless hollow core fiber," Optics Express, vol. 22, No. 20, pp. 23807-23828 (2014) DOI: 10.1364/OE 22.023807.

(Continued)

*Primary Examiner* — Chris H Chu
(74) *Attorney, Agent, or Firm* — Panitch Schwarze Belisario & Nadel LLP

(57) ABSTRACT

Optical components in the form of anti-resonant hollow-core fibres or preforms therefor contain a hollow core, a jacket with a circumferential inner side that faces the hollow core, and anti-resonant structural elements. In order to provide a method for producing an optical component with anti-resonant structural elements of a first type, which depart from the circular or oval shape and which are respectively of arcuate design in cross section as seen in the direction of the longitudinal axis of the component, with a left-hand arc end and with a right-hand arc end and with a bulge towards the hollow core, wherein the arc ends are connected to the inside of the jacket at contact points and, together with the inside of the jacket, span a curvature surface, the present document proposes a method.

7 Claims, 4 Drawing Sheets

Figure 1:
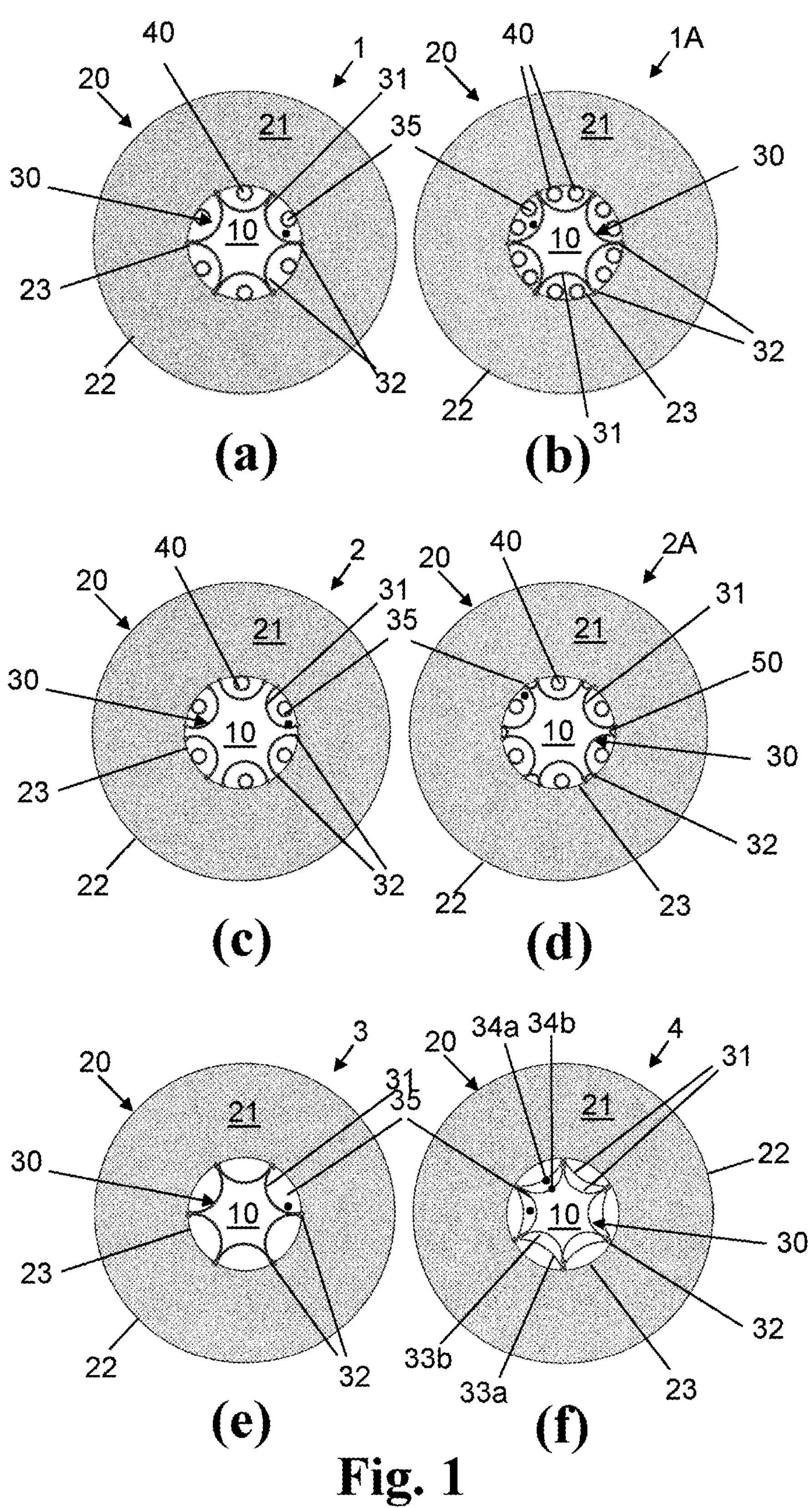

(51) Int. Cl.

| | |
|---|---|
| ***C03B 37/027*** | (2006.01) |
| ***G02B 6/032*** | (2006.01) |

(56) References Cited

U.S. PATENT DOCUMENTS

| | | | | |
|---|---|---|---|---|
| 2017/0160467 | A1 | 6/2017 | Poletti et al. | |
| 2018/0267235 | A1* | 9/2018 | Russell | G02B 6/02342 |
| 2019/0101695 | A1* | 4/2019 | Poletti | H01S 3/1618 |
| 2020/0241200 | A1* | 7/2020 | Wang | G02B 6/02328 |

FOREIGN PATENT DOCUMENTS

| | | | |
|---|---|---|---|
| CN | 110579836 | B | 10/2020 |
| EP | 3008021 | B1 | 11/2019 |
| FR | 3006774 | A1 | 12/2014 |
| GB | 2583352 | A | 10/2020 |
| JP | 2018150184 | A | 9/2018 |
| WO | 2020217052 | A1 | 10/2020 |

OTHER PUBLICATIONS

Debord et al., Hollow-Core Fiber Technology: The Rising of "Gas Photonics," MDPI fibers Review, vol. 7, No. 16, pp. 1-58 (2019).

Chen et al., "Low-loss single-mode negatively curved square-core hollow fibers," Optics Letters, vol. 42, No. 7, pp. 1285-1288 (2017).

Van Putten et al., "Exploring the Effect of the Core Boundary Curvature in Hollow Antiresonant Fibers," IEEE Photonics Technology Letters, vol. 29, No. 2, pp. 263-266 (Jan. 15, 2017).

Nawazuddin et al., "Lotus-Shaped Negative Curvature Hollow Core Fiber With 10.5 dB/km at 1550 nm Wavelength," Journal of Lightwave Technology, vol. 36, No. 5, pp. 1213-1219 (Mar. 1, 2018).

Bradley et al.—Antiresonant Hollow Core Fibre with 0.65 dB/km Attenuation across the C an L Telecommunication Bands, ECOC 2019.

Bradley et al.—Record Low-Loss 1.3 dB/km Data Transmitting Antiresonant Hollow Core Fibre, ECOC PDP (2018).

Jasion et al.—Novel ARHCF Design with Ultralow Leakage Loss using Transverse power flow analysis, OFC (2019).

* cited by examiner

ANTI-RESONANT OPTICAL COMPONENT AND METHOD FOR THE PRODUCTION OF SAME

TECHNICAL BACKGROUND

The invention is in the field of anti-resonant hollow-core fibers and the preforms for drawing anti-resonant hollow-core fibers.

In particular, the invention relates to an anti-resonant optical component which comprises a hollow core extending along a component longitudinal axis, a sheath surrounding the hollow core with a circumferential inner side facing the hollow core, and anti-resonance elements.

In addition, the invention relates to a method for producing an anti-resonant optical component, which comprises a hollow core extending along a component longitudinal axis, a sheath surrounding the hollow core with a circumferential inner side facing the hollow core, and anti-resonance elements.

Conventional single-mode optical fibers have a core region made of solid material, which is surrounded by a sheath region made of glass with a lower refractive index. Light guidance is based thereby on total reflection between the core and the sheath region. However, the interactions of the guided light with the solid material are associated with an increased latency in data transmission and relatively low damage thresholds with respect to high-energy radiation.

In contrast, in the case of an "anti-resonant hollow-core fiber" (ARHCF), a hollow core region is provided which is surrounded by a sheath region, in which so-called "anti-resonant elements" ("AREs" for short) are arranged. The walls of the anti-resonance elements evenly distributed around the hollow core can act as Fabry-Perot cavities operated in anti-resonance, which cavities reflect the incident light and guide it through the hollow fiber core.

Potential applications of these hollow-core fibers are in the fields of data transmission, high-power beam guidance, for example for material processing, modal filtering, nonlinear optics, in particular for super-continuum generation, from the ultraviolet to infrared wavelength range.

Hollow-core fibers also enable precision spectroscopy studies on media (gases or liquids) located in the hollow core. Because the light guided in the core to a large extent overlaps with the medium to be examined, concentrations in the ppm range may also be detected. In addition, use in optical atomic clocks, quantum computers and fluorescence microscopy also comes into consideration.

PRIOR ART

Anti-resonant hollow-core fibers frequently have a comparatively high attenuation. This is attributable to the fact that higher-order modes are not necessarily suppressed, so that over long transmission lengths they are often not exclusively single-mode and the quality of the output beam deteriorates.

In the paper by Francesco Poletti "Nested antiresonant nodeless hollow core fiber," Optics Express, vol. 22, no. 20 (2014), DOI: 10.1364/OE 22.023807, a fiber design is proposed, with which anti-resonance elements are not designed as a simple singular structural element, but are composed of several nested structural elements. The nested anti-resonance elements are designed such that higher-order core modes, but not the fundamental core mode, are phase-matched to the sheath modes and are suppressed. As a result, the propagation of the fundamental core mode is always ensured, and the hollow-core fiber can be effectively single-mode over a limited wavelength range.

Effective mode suppression depends on the center wavelength of the transmitted light and on the structural parameters of the fiber design, such as the radius of the hollow core and the difference in the diameters of nested ring structures in the anti-resonance elements.

In the radial cross section (as seen in the direction of the hollow-core fiber longitudinal axis), the anti-resonant structural elements generally have a circular or oval shape. In order to further reduce the attenuation loss, in recent times anti-resonant hollow-core fibers have been proposed having a design in which the hollow core is surrounded by an inner sheath layer in which anti-resonant structural elements are arranged which depart from the circular or oval shape and form, for example, a partial circle (circular arc, semicircle) or a partial oval or structures derived therefrom.

Thus, for example, Yang Chen, Mohammed F. Saleh, Nicolas Y. Joly and Fabio Biancalana in the paper, "Low-loss single-mode negatively curved squarecore hollow fibers" in Optics Letters Vol. 42, issue 7, pp. 1285-1288 (2017); DOI: 10.1364/OL.42.001285, describe a novel anti-resonant hollow-core fiber made of quartz glass, in which four eye-like hollow sheath regions are formed within an inner tube and are distributed evenly around the hollow core. The hollow core has a negatively curved, approximately square shape.

From CN 111 474 627 A, an anti-resonance hollow-core fiber is known in which the hollow core is surrounded by a sheath. In the cross section as seen in the direction of the longitudinal axis of the fiber, the fiber has an inner region facing the hollow core around which five closed and spaced-apart structural elements are distributed evenly in the circumferential direction. Each of the structural elements forms a cavity that includes a further circular or circular-sector-shaped structural element connected to the inside of the sheath.

GB 2 583 352 A discloses a preform for anti-resonant optical hollow-core fibers with anti-resonance elements of arcuate design curved in an inward direction, the arc ends of which are connected to the inside of the sleeve tube at contact points and, together with the inside of the sleeve tube, span a curvature surface. Double arcs are also described. For the production of the anti-resonance elements, profiled glass tubes are inserted into a sleeve tube. The profile has straight longitudinal sections, connected to curved longitudinal sections. The straight longitudinal sections rest against the sleeve tube wall. In the case of nested profile tubes, the straight longitudinal section of the inner profile tube rests against the straight longitudinal section of the outer profile tube.

CN 110 579 836 B describes a preform for a hollow core optical fiber with a plurality of resonance layers, with a sleeve tube and anti-resonant elements of a first type, which are curved inward in an arcuate shape, as well as anti-resonance elements of a second type, which are rectangular and are arranged within the bulges. The ends of the arcuate and rectangular anti-resonance elements are connected to the sleeve tube inner wall. The anti-resonance elements, together with the sleeve tube, form a plurality of differently shaped cavities with a lower refractive index. The production is carried out according to the "stack and draw method."

FR 3 006 774 A1 describes a hollow core waveguide which is bounded by a closed contour comprising a row of arcs with negative curvature, wherein small arcs and large arcs alternate. In the case of the large arcs, the ratio b=2Ra/C is greater than 0.9 (Ra=maximum distance between the chord and arc; C=chord length). The fibers are produced by the "stack and draw method" by producing, arranging and stretching capillaries with a circular cross section. The contour of the core is achieved by optimizing the rheological material parameters, the temperatures and the pressure differences between the capillaries during the drawing phase. The machining process is mentioned as a further production method.

TECHNICAL OBJECT

According to the above-cited paper of Yang Chen et al., the negative curvature enables a coupling between the core modes of higher order and the sheath modes and reduces the attenuation loss by removing the mode field as far as possible from the nodes in the region of the four corners.

According to CN 111 474 627 A, the transmission loss of the anti-resonant hollow-core fiber is reduced by the innovative optical fiber structure, and the light loss is prevented, so that the optical fiber has a low transmission loss, and even an ultra-low transmission loss of less than 0.1 dB/km.

However, the information or assumptions relating to attenuation in both documents are based on simulations, not on measurements. A method for producing the anti-resonant hollow-core fibers is not specified.

The aim of the invention is therefore to provide an optical component in the form of an anti-resonant hollow-core fiber or a preform therefor, with a design which comprises a hollow core in radial cross section, surrounded by an inner sheath layer in which anti-resonant structural elements are arranged which depart from the circular shape.

Furthermore, the object of the invention is to provide a method for producing such an optical component (anti-resonant hollow-core fiber or preform for drawing the hollow-core fiber).

SUMMARY OF THE INVENTION

With regard to the anti-resonant optical component, this object is achieved according to the invention in that it has a hollow core extending along a component longitudinal axis, a sheath surrounding the hollow core with a circumferential inner side facing the hollow core, and anti-resonance elements of a first type, which are respectively of arcuate design in cross section as seen in the direction of the component longitudinal axis, with a left-hand arc end and with a right-hand arc end and with a bulge toward the hollow core, the arc ends being connected to the inside of the sheath at contact points and, together with the inside of the sheath, spanning a curvature surface.

The anti-resonant optical component (for short: component) is an anti-resonant hollow-core fiber (for short: hollow-core fiber) or a preform for an anti-resonant hollow-core fiber (for short: preform). In its radial cross-sectional design, it is characterized in that at least a portion of the anti-resonance elements do not have a closed circular or oval shape but an "arcuate shape," the two "free" arc ends being attached to the inside of the sheath (but not connected to one another). This design is also referred to below as "arcuate design" for linguistic differentiation from the usual "circular or oval design."

The anti-resonance elements of the first type are of arcuate design in cross section and, together with the inside of the sheath, enclose a curvature surface with a bulge toward the hollow core. The curvature surface is mirror-symmetrical with respect to a mirror axis which extends through the arc apex and the connecting line of the arc ends, the connecting line of the arc ends being formed by the inside of the sheath in the cross section under consideration and having its radius. The curvature surface and the inside of the sheath delimit a non-round curvature interior.

The number of curves is, for example, four, preferably between five and ten, the arcs being distributed evenly around the inside of the sheath.

The "arcuate design" is suitable for reducing attenuation losses compared to the usual "circular or oval designs" with anti-resonance elements closed in an annular or oval shape.

A further improvement in this regard results in a preferred embodiment of the optical component in which a second type of anti-resonance elements is provided, anti-resonance elements of the second type being nested with anti-resonance elements of the first type in the sense that, in the cross section as seen in the direction of the component longitudinal axis, in each case at least one anti-resonance element of the second type is arranged within a curvature interior space bounded by the curvature surface. The anti-resonance elements of the first and second type have the same basic geometry (for example arcuate), or they have different basic geometries (for example arcuate on the one hand or oval or circular on the other hand). In each case, the anti-resonance elements of the second type result in an additional degree of freedom in design.

It has proven particularly advantageous if the nested anti-resonance elements of the second type are each connected to the inside of the sheath.

In the case of hollow-core fibers or preforms with an "oval design," anti-resonance elements are known which are composed of a plurality of structural elements nested with one another, for example of an inner capillary, which is fused to the inner wall of an outer capillary. In the fiber drawing process, this composite is softened and stretched, wherein reciprocal influences of the capillaries due to the surface tension, and undesired deformations, may occur. These deformations are prevented when the nested anti-resonance element of the second type is connected to the inside of the sheath and has no contact with the arcuate anti-resonance element of the first type.

Advantageously, the nested anti-resonance elements of the second type are in each case circular or oval in cross section as seen in the direction of the component longitudinal axis.

They contribute to the coupling of higher-order core modes to the light modes conducted in the sheath, whereby the latter are suppressed for the benefit of the energy and propagation of the fundamental core mode.

In a preferred embodiment of the optical component, at least four anti-resonance elements of the first type are distributed evenly around the inside of the sheath, the arc ends of adjacent anti-resonance elements of the first type having contact with one another.

Due to the contact of the arc ends of adjacent anti-resonance elements of the first type, it is possible to completely cover the inside of the sheath in a simple manner, so that no reflective surface with a positive, concave curvature, which could impair the anti-resonance conditions, is present as seen from the direction of the hollow core.

In another preferred embodiment of the optical component, at least four anti-resonance elements of the first type are distributed evenly around the inside of the sheath, the arc ends of adjacent anti-resonance elements of the first type not having any contact with one another.

Overlapping of anti-resonance elements of the first type can lead to so-called "nodes," which interfere with the transmission properties of the micro-structured optical fiber and thus lead to attenuation losses. Such nodes are reliably prevented by the contact points of the arc ends of adjacent anti-resonance elements of the first type having no contact with one another.

In order to completely cover the concave surfaces of the inside of the sheath, in a preferred development of this embodiment anti-resonance elements of a third type are provided, at least one anti-resonance element of the third type being arranged between adjacent anti-resonance elements of the first type in each case and being connected to the adjacent anti-resonance elements of the first type and to the inside of the sheath.

As seen from the direction of the hollow core, the anti-resonance elements of the third type have, for example, a negative curvature (convex) or no curvature (planar, straight). Together with the anti-resonance elements of the first type, they cover the inside of the sheath completely, so that this inside does not impair the anti-resonance conditions.

In a further preferred embodiment of the optical component, the anti-resonance elements of the first type in cross section as seen in the direction of the component longitudinal axis are formed in the shape of an inner arc and a nested outer arc, each having a left-hand arc end and a right-hand arc end and with a bulge toward the hollow core, the left-hand arc ends of the nested outer arc and of the inner arc each being connected to one another, and the right-hand arc ends of the nested outer arc and of the inner arc each being connected to one another.

Seen in radial cross section, the anti-resonance elements of the first type form double arcs here, the nested outer arcs in each case being arranged within the curvature interior space of the inner arc. In this consideration, the common connecting line of the arc ends of the double arc is formed in each case by the inside of the sheath, the arc apexes lying on a straight line which runs from the center point of the optical component (of the component longitudinal axis) in the radial direction. The outer arc has a smaller curvature (and thus a larger radius) than the inner arc.

Due to the fact that the "free" arc ends of adjacent double arcs are in contact with one another, the convex inside of the sheath is completely covered by the double arcs, so that this inside does not impair the anti-resonance conditions. Preferably, four to ten double arcs are distributed evenly around the inside of the sheath.

With regard to the method for producing the anti-resonant optical component, the technical object specified further above is achieved according to the invention by a method comprising the method steps of:

(a) providing a sleeve tube comprising an inner bore of the sleeve tube and a longitudinal axis of the sleeve tube along which a sleeve tube wall bounded by an inside and an outside extends, the sleeve tube having an internal diameter $d_H$, (b) providing anti-resonance element preforms comprising at least one first anti-resonant element mother tube (ARE mother tube) which has a mother tube inner bore and a mother tube longitudinal axis along which a mother tube wall bounded by an inside and an outside extends, the first ARE mother tube having an external diameter $D_{M1}$, (c) providing support tubes with an external diameter $D_S$, where: $D_{M1}+2D_S \leq d_H$, (d) forming a cylinder assembly comprising the sleeve tube, the first ARE mother tube arranged coaxially thereto, and multiple support tubes arranged with parallel axes in an annular gap between the sleeve tube and the first ARE mother tube and distributed around the circumference of the annular gap, (e) stretching the cylinder assembly to yield the optical component, reduced pressure being generated in the support tubes and increased pressure being generated in the first ARE mother tube so that the sleeve tube in part and the support tubes at least in part collapse so as to form contact points between the inside of the previous sleeve tube and the outside of the previous first ARE mother tube, and arcuate anti-resonance elements of a first type, which are respectively of arcuate design in cross section as seen in the direction of the component longitudinal axis with a left-hand arc end and with a right-hand arc end and with a bulge toward the hollow core, the arc ends being connected to the inside of the sheath at contact points and, together with the inside of the sheath, spanning a curvature surface.

Produced from the cylindrical components, namely the sleeve tube, at least one ARE mother tube and multiple support tubes, is a semi-finished product in the form of a cylinder assembly in which semi-finished product the components are loosely inserted into one another in a vertical orientation and are held at their upper ends, or in which all components or individual components are connected to one another.

By stretching and collapsing the cylinder assembly, a preform is obtained or the anti-resonant hollow-core fiber is obtained. In both cases, a plurality of arcuate anti-resonance elements that are connected to one another are produced from the at least one ARE mother tube. The ARE mother tube is reshaped to form the first anti-resonance elements. The support tubes contribute to the reshaping in that they are placed at predetermined attachment points of the outside of the ARE mother tube and attach these attachment points to predetermined contact points of the inside of the sleeve tube. This is done by an attachment and inflation process comprising the following measures:

(1) The support tubes are evenly distributed individually or in pairs around the circumference of the annular gap between the sleeve tube and the ARE mother tube arranged coaxially thereto, wherein they have or receive contact both with the attachment points of the outside of the ARE mother tube and with the contact points of the sleeve tube before the collapse or during the collapse of the cylinder assembly. Between adjacent support tubes, as a result a laterally closed hollow channel is formed in each case in the annular gap. Its boundary is formed by the ARE mother tube, the sleeve tube and the support tubes on both sides.

(2) The support tubes are completely or partially collapsed during collapse of the cylinder assembly itself, and their initial volume is reduced to that extent. In general, support tubes are preferred which disappear almost completely and therefore have as small a wall thickness as possible, for example less than 0.5 mm, (3) When the cylinder assembly collapses, a reduced pressure (negative pressure) compared to the ambient pressure is applied to those support tubes which serve to attach the ARE mother tube to the contact points of the sleeve tube.

(4) When the cylinder assembly collapses, an increased pressure (overpressure) compared to the ambient pressure is applied in the hollow channels, so that the ARE mother tube is deformed between the attachment points fixed to the sleeve tube and arcuate bulges are inflated toward the hollow core. Each arcuate bulge, together with a section of the inside of the (previous) sleeve tube, delimits a curvature interior space.

In the anti-resonant hollow-core fiber (or in the preform therefor) produced in this way, the previous support tubes thus completely or partially disappear, and the previous ARE-mother tube forms a plurality of anti-resonance elements, which are respectively of arcuate design in cross section as seen in the direction of the longitudinal axis of the component, with a left-hand arc end and with a right-hand arc end and with a bulge toward the hollow core, the arc ends being fixed to the previous inside of the sheath and, together with the inside of the sheath, spanning a curvature surface.

The method according to the invention is suitable for producing the anti-resonant optical component according to the invention described above with "arcuate design" and, based on knowledge of the applicant, for the first time allows the production of an anti-resonant hollow-core fiber or a preform for drawing an anti-resonant hollow-core fiber with an "arcuate design." In addition to the sleeve tube, important starting elements for this purpose are at least one ARE mother tube and multiple support tubes.

In a preferred procedure, at least four support tubes are distributed evenly in the annular gap in the cylinder assembly formed according to method step (d).

In this procedure, an optical component can be produced with four and more arcuate bulges, in which component adjacent arcuate bulges can share a support tube. The adjacent arcuate bulges are connected to one another on the previous support tubes and they completely cover the inside of the sheath.

In another preferred procedure, at least eight support tubes are arranged in pairs in the cylinder assembly formed according to method step (d), and the support tube pairs are distributed evenly in the annular gap.

In this procedure as well, an optical component with four and more arcuate bulges can be produced, wherein adjacent arcuate bulges do not share a support tube. An intermediate space which results from the spacing of the previous support tubes can therefore remain between adjacent arcuate bulges.

It has proven advantageous if, during the formation of the cylinder assembly according to method step (d), either at least a portion of the support tubes is fixed to the outside of the mother tube or to the inside of the sleeve tube.

The fixing takes place in advance during the stretching and collapsing of the cylinder assembly, or it takes place during an upstream slight collapse of the sleeve tube. This pre-assembly facilitates the assembly of the cylinder assembly and improves its dimensional accuracy.

A particularly advantageous method variant is characterized in that the anti-resonance element preforms provided according to method step (b) are a plurality of nested capillaries (NE capillaries, NE stands for "nested element") with an external diameter $D_Z$, where: $D_Z < D_S < D_{M1}$, where, in the cylinder assembly formed according to method step (d), the NE capillaries are fixed to the inside of the sleeve tube and are arranged with parallel axes in the annular gap between support tubes, and where, during the stretching of the cylinder assembly according to method step (e), an increased pressure is generated in the NE capillaries, so that anti-resonance elements of a second type are formed therefrom and are nested with the anti-resonance elements of the first type in the sense that in cross section as seen in the direction of the longitudinal axis of the component, in each case at least one anti-resonance element of the second type is arranged within a curvature interior space bounded by the curvature surface.

During the stretching of the cylinder assembly according to method step (e), anti-resonance elements of a second type are formed from the NE capillaries. In cross section as seen in the direction of the longitudinal axis of the component, these are arranged in each case within the curvature interior space bounded by the curvature surface, which is spanned by the anti-resonance elements of the first type. The initial external diameter of the NE capillaries is smaller than the initial external diameter of the first ARE mother tube.

The NE capillaries are arranged in the same annular gap as the support tubes and between them. In order for the NE capillaries not to hinder the attachment and inflation process, their outer diameter is smaller than the external diameter of the support tubes.

During the formation of the cylinder assembly according to method step (d), the NE capillaries are preferably fixed to the inside of the sleeve tube. The fixing takes place in advance during the stretching and collapsing of the cylinder assembly, or it takes place during an upstream slight collapse of the sleeve tube. This pre-assembly facilitates the assembly of the cylinder assembly and improves its dimensional accuracy.

During the stretching and collapsing of the cylinder assembly, an increased pressure (overpressure) relative to the ambient pressure is produced in the NE capillaries, so that they are inflated to form the anti-resonance elements of the second type. They are therefore substantially (in radial cross section) circular or oval.

In a further advantageous method variant, the anti-resonance element preforms provided according to method step (b) comprise at least one second ARE mother tube with an external diameter $D_{M2}$; where: $D_S < D_{M2} < D_{M1}$; and, in the cylinder assembly formed according to method step (d), the second ARE mother tube being arranged coaxially to the sleeve tube and to the first ARE mother tube, and multiple hollow support elements being provided that are arranged with parallel axes and distributed in an annular gap between the first ARE mother tube and the second ARE mother tube, and, during the stretching of the cylinder assembly according to method step (e), a reduced pressure being generated in the hollow support elements and an increased pressure being generated in the second mother tube, so that the hollow support elements collapse, forming (a) contact points between the inside of the previous first ARE mother tube and the outside of the previous second ARE mother tube, and forming (b) arcuate anti-resonance elements of the first type.

Anti-resonance elements of the first type are generated from the second ARE mother tube, as well as from the first ARE mother tube. As a result of the coaxial arrangement of first ARE mother tube and second ARE mother tube, the outer arcs produced from the first ARE mother tube (closer to the sheath) and the inner arcs produced from the second ARE mother tube and further removed from the sheath together form a double arc. The outer arcs are nested in the inner arcs and therefore form nested structural elements (nested elements). The apexes lie on a common straight line, which runs from the center point of the optical component (the component longitudinal axis) outward in the radial direction. The inner arc has less curvature (and thus a larger radius) than the outer arc.

To generate the inner arcs, hollow support elements are evenly distributed individually or in pairs in the annular gap between the first and second ARE mother tubes. The hollow support elements correspond to the support tubes explained above and they can have the same geometry (diameter, wall thickness) and material composition or a different geometry and material composition.

During the stretching and collapsing of the cylinder assembly according to method step (e), a reduced pressure (negative pressure) relative to the ambient pressure is generated in the hollow supporting elements and an increased pressure (overpressure) relative to the ambient pressure is generated in the second ARE mother tube. Upon collapse, the hollow support elements adhere predetermined attachment points of the second ARE mother tube to predetermined contact points on the inside of the first ARE mother tube using the attachment and inflation process discussed above for the "support tubes". In order for a double arc to form, the attachment points lie in pairs on common straight lines in the first ARE mother tube and in the second ARE mother tube, which lines extend from the center point of the optical component (the component longitudinal axis) in the radial direction. Accordingly, the support elements or the "support tubes" are also positioned on these lines.

Measurement Methods and Definitions

Individual method steps and terms of the above description are additionally defined below. The definitions form part of the description of the invention. In the event of a substantive conflict between one of the following definitions and the remaining description, the statements made in the rest of the description prevail.

Anti-Resonance Elements

Anti-resonance elements may be simple or nested structural elements of the hollow-core fiber. They have at least one wall that, as seen from the direction of the hollow core, has a negative curvature (convex) or does not have a curvature (planar, straight). They generally consist of a material that is transparent to the working light, for example glass, in particular doped or undoped $SiO_2$, a plastic, in particular a polymer, a composite material or crystalline material.

Anti-Resonance Element Preform

What are referred to as anti-resonance element preforms are components or constituents of the preform that essentially are formed into anti-resonance elements in the hollow-core fiber by simple elongation during the fiber-drawing process. Nested anti-resonance element preforms form nested anti-resonance elements in the hollow-core fiber. They are composed of an ARE outer tube and at least one further structural element that is arranged in the inner bore of the ARE outer tube. The further structural element can be a further tube which bears against the inner surface of the outer tube. The further tube is referred to as a "nested element" or "NE inner tube" for short, "NE capillary" or also a "nested NE inner tube."

In the case of multiply nested anti-resonance element preforms, at least one further structural element, for example a third tube resting against the inner sheath surface of the nested NE inner tube, can be arranged in the inner bore of the NE inner tube. Where there are multi-nested anti-resonance element preforms, in order to distinguish between the multiple tubes that are arranged within the ARE outer tube, a distinction can be made where applicable between "outer NE inner tube" and "inner NE inner tube."

The term "cross section" in connection with cylindrical anti-resonance element preforms, the cylindrical structural elements thereof and the capillary semi-finished product always refers to the cross section perpendicular to the respective longitudinal axis of the cylinder, namely—unless otherwise indicated—the cross section of the exterior contour in tubular components (not the cross section of the interior contour).

Further processing of the primary preform, in particular by hot-forming steps, can result in intermediate products, in which the original anti-resonance element preforms are present in a shape that has been modified compared to the original shape. The modified shape is also referred to here as an anti-resonance element preform.

Preform/Primary Preform/Secondary Preform/Core Preform (Cane)

The preform is the component from which the anti-resonant hollow-core fiber is drawn. It is a primary preform or a secondary preform produced by further processing of the primary preform. The primary preform can be present as an assembly consisting of at least one sleeve tube and preforms or precursors for anti-resonance elements that are loosely accommodated or firmly fastened therein. The further processing of the primary preform into a secondary preform from which the hollow-core fiber is drawn can comprise a single or repeated performance of one or more of the following hot-forming processes:

(i) stretching,
(ii) collapse,
(iii) collapse and simultaneous stretching,
(iv) collapse of additional sheath material,
(v) collapse of additional sheath material and subsequent stretching,
(vi) collapse of additional sheath material and simultaneous stretching.

A preform which is obtained by collapsing and/or stretching a primary preform, and which thus falls under the definition of the secondary preform, is referred to in the literature as a core preform (cane). Typically, it is overlaid with additional sheath material before or during drawing of the hollow-core fiber.

Stretching/Collapsing

During stretching, the primary preform is thermally elongated. The elongation can take place without simultaneous collapse. Stretching can be performed true to scale, so that, for example, the shape and arrangement of components or constituents of the primary preform is reflected in the elongated, stretched end product. During stretching, however, the primary preform can also be drawn not true to scale and its geometry can be modified.

During collapse, an inner bore is narrowed or annular gaps between tubular components are closed or narrowed. Collapse is generally accompanied by stretching.

Hollow Core/Inner Sheath Region/Outer Sheath Region

The assembly comprising at least one sleeve tube and ARE preforms loosely accommodated or firmly fastened therein is also referred to herein as "primary preform." The primary preform comprises the hollow core and a sheath region. This sheath region is also referred to as an "inner sheath region" if there is also an "outer sheath region" that has been produced, for example, by collapsing onto the assembly, and if a distinction is to be made between said sheath regions. The terms "inner sheath region" and "outer sheath region" are also used for the corresponding regions in the hollow-core fiber or in intermediate products obtained by further processing of the primary preform.

The designation "inner side of the tube" is also used as a synonym for "inner surface of the tube" and the designation "outer side of the tube" is also used as a synonym for "outer surface of the tube." The term "inner bore" in conjunction with a tube does not mean that the inner bore has been produced by a drilling process.

EXEMPLARY EMBODIMENT

Figure 2:
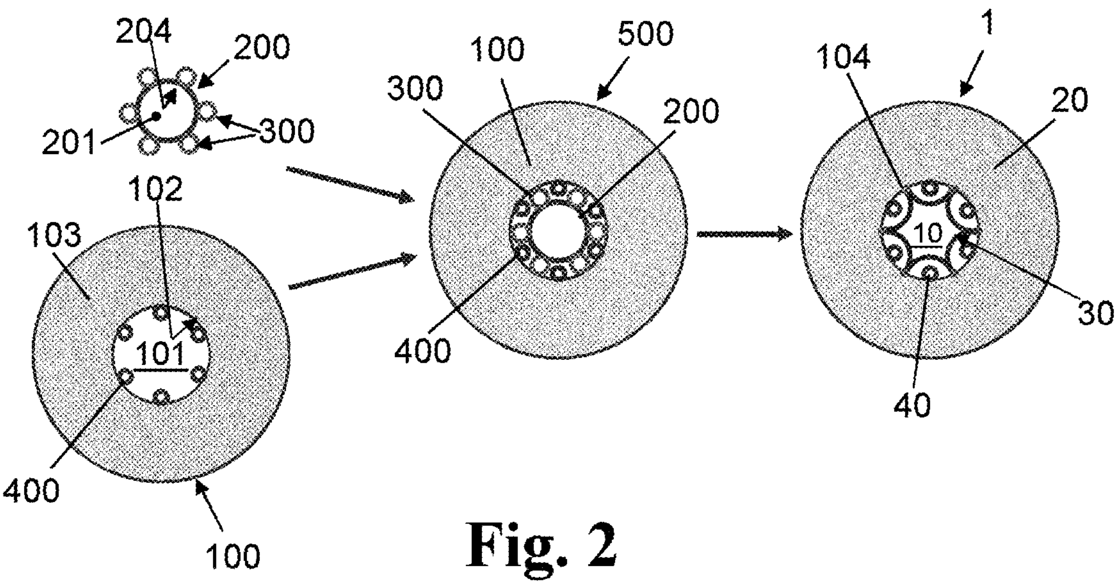
Figure 3:
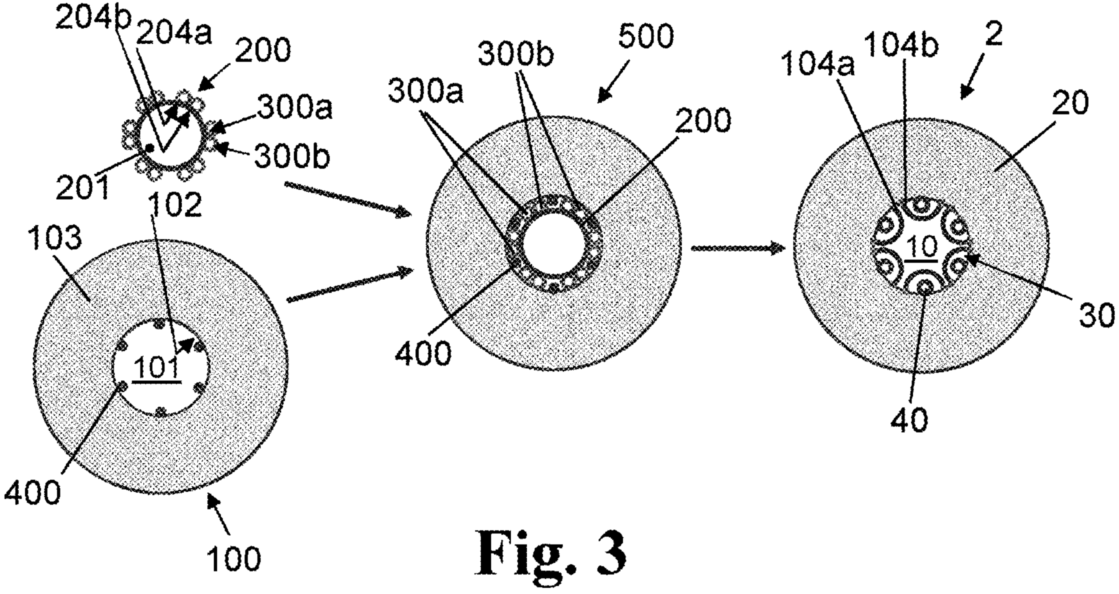
Figure 4:
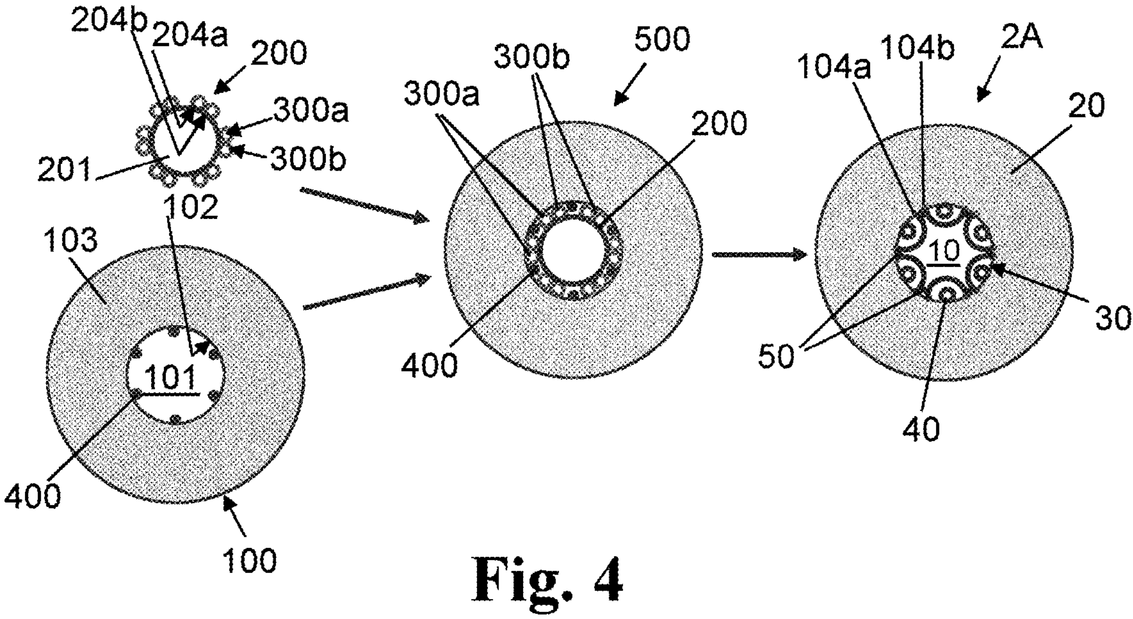
Figure 5:
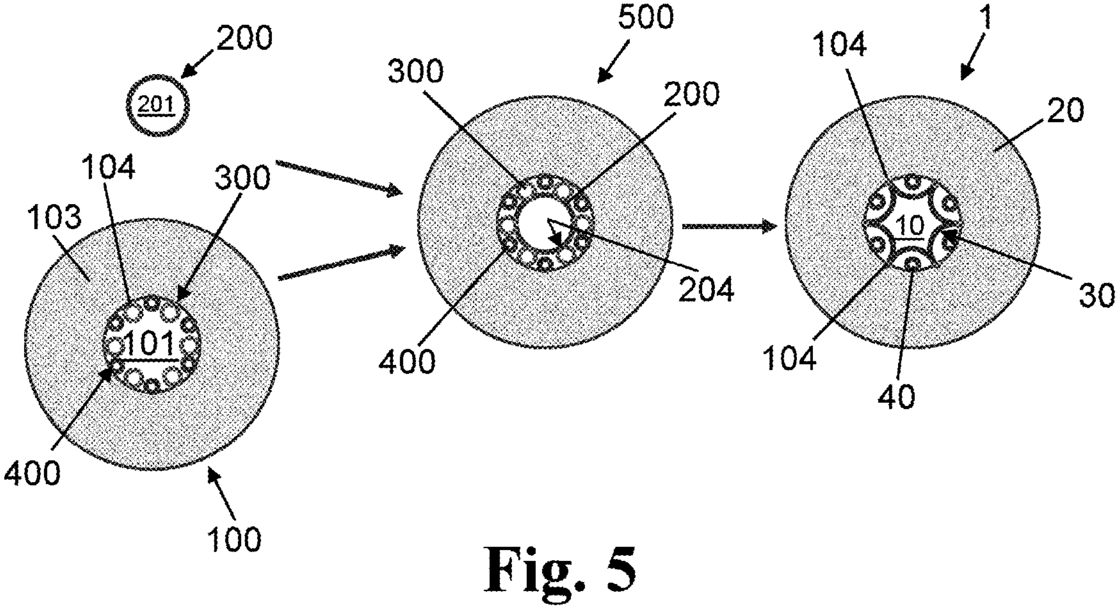
Figure 6:
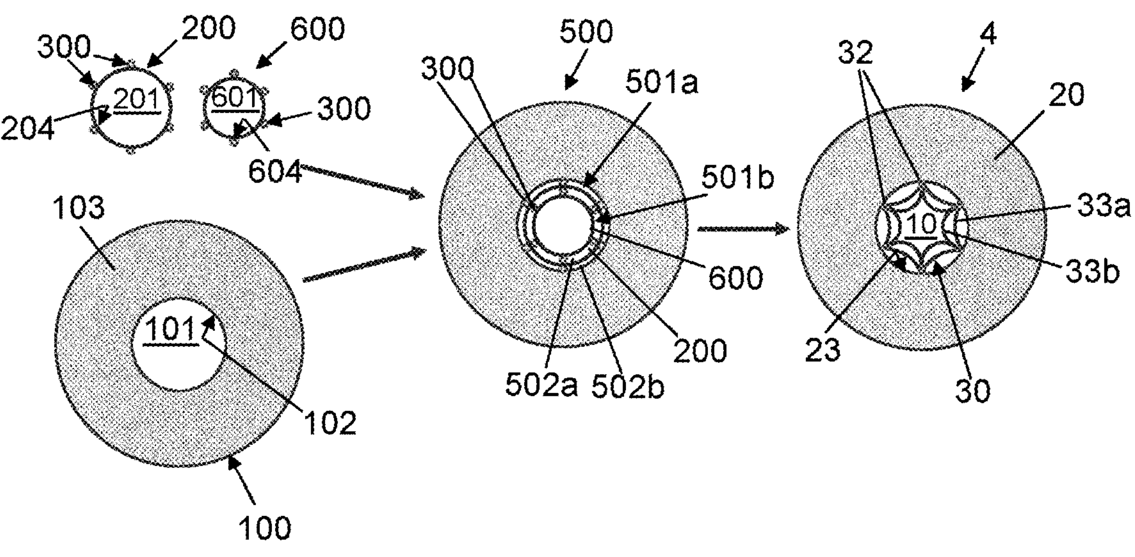

The invention is explained in more detail below with reference to an exemplary embodiment and a drawing. The following are shown in detail in schematic representation:

FIG. 1 cross sections of anti-resonant hollow-core fibers or of preforms thereof with different "arcuate designs" according to the invention, FIG. 2 method steps for producing an anti-resonant hollow-core fiber with a first variant of the Design 1 of FIG. 1, FIG. 3 method steps for producing an anti-resonant hollow-core fiber with the Design 2 of FIG. 1, FIG. 4 method steps for producing an anti-resonant hollow-core fiber with the Design 2A of FIG. 1, FIG. 5 method steps for producing an anti-resonant hollow-core fiber with a second FIG. 5 variant of the Design 1 of FIG. 1, and FIG. 6 method steps for producing an anti-resonant hollow-core fiber with the Design 4 of FIG. 1.

The Designs 1, 1A, 2, 2A, 3, 4 schematically illustrated in FIG. 1 are identical for an anti-resonant hollow-core fiber and for a preform from which the hollow-core fiber can be drawn. All Designs 1, 1A, 2, 2A, 3, 4 have a hollow core 10; a sleeve tube 20 with a wall 21, an outside 22 and an inside 23; arcuate anti-resonance elements 30 with curvature surfaces 31, which have a negative (convex) curvature as seen from the hollow core 10, and the two arc ends of which are attached to attachment points 32 of the inside 23 of the sheath, and which each delimit a curvature interior space 35 together with a portion of the inside of the sleeve tube.

In Designs 1, 1A, 2, 2A, inner, nested anti-resonance elements 40 with a round cross section are arranged within the curvature interior spaces and are connected to the inside 23 of the sheath.

In Designs 1 and 1A, the arcuate anti-resonance elements 30 are connected to one another, adjacent arcs sharing an attachment point 32. In the Design 1 in FIG. 1(*a*), a single nested anti-resonance element 40 with a round cross section is arranged within each curvature interior space 35. In the Design 1A of FIG. 1(*b*), the nested anti-resonance elements 40 with a round cross section are arranged in pairs within each curvature interior space 35.

In Designs 2 and 2A, the arcuate anti-resonance elements 30 are not connected to one another. Each arcuate anti-resonance element 30 has two attachment points 32, at which it is fixed on the inside 23 of the sheath. A single nested anti-resonance element 40 with a round cross section is arranged within each curvature interior space 35. In the Design 2 in FIG. 1(*c*), a free strip of the inside 23 of the sheath extends between adjacent arcuate anti-resonance elements 30. In the Design 2A of FIG. 1(*d*), a further anti-resonance element 50 with negative curvature is arranged between adjacent arcuate anti-resonance elements 30 and completely covers the free strip of the inside 23 of the sheath.

The Designs 3 and 4 contain only arcuate anti-resonance elements 30 which are connected to one another, adjacent arcs sharing an attachment point 32.

The Design 3 shown in FIG. 1(*e*) has simple arcuate anti-resonance elements 30. The Design 4 shown in FIG. 1(*f*) has arcuate anti-resonance elements 30 which are designed as double arcs 33*a*, 33*b*. The double arcs 33*a*, 33*b* have different radii and common attachment points 32. Their arc apexes 34*a*, 34*b* are each located on the same radial line. The outside arc 33*b* closer to the sheath 20 is nested in the inner arc 33*a*.

The production of Designs 1, 2, 2A and 4 will be explained below with reference to FIGS. 2 to 4.

FIG. 2 schematically shows a first variant for the production of an anti-resonant hollow-core fiber with the Design 1. The following cylindrical components are provided for this purpose:

(i) a thick-walled sleeve tube 100 ("jacket tube") made of quartz glass and comprising an inner bore 101 of the sleeve tube and a longitudinal axis of the sleeve tube along which a sleeve tube wall 103 bounded by an inside 102 of the sleeve tube and an outside extends. The sleeve tube 100 has an internal diameter $d_H$ of 25 mm and an external diameter of 90 mm.

(ii) an anti-resonance element mother tube 200 (ARE mother tube) made of quartz glass which has a mother tube inner bore 201 and a mother tube longitudinal axis along which a mother tube wall bounded by an inside and an outside extends. The ARE mother tube has an external diameter $D_{M1}$ of 20 mm.

(iii) six structurally identical support tubes 300 made of quartz glass, each of which has an external diameter $D_S$ of 2.5 mm and a wall thickness of 0.15 mm.

(iv) also six structurally identical capillaries 400 made of quartz glass, each of which has an external diameter $D_Z$ of 2.2 mm and a wall thickness of 0.35 mm.

These cylindrical components (100; 200; 300, 400) are joined to form a component assembly 500. For this purpose, the six support tubes 300 are thermally fixed at predetermined attachment points 204 of the outside of the ARE mother tube 200 so that the longitudinal axes of all tubes (200, 300) extend parallel to each other, and the support tubes 300 are evenly distributed (at an angle of 60 degrees) around the outside of the ARE mother tube 200.

In addition, the six capillaries 400 are thermally fixed on the inside of the sleeve tube 100, so that the longitudinal axes of all tubes (100, 400) run parallel to one another and the capillaries 400 are distributed evenly (at an angle of 60 degrees) around the inside of the sleeve tube 100.

The joining combination of ARE mother tube 200 and support tubes 300 is inserted into the inner bore 101 of the other joining combination of sleeve tube 100 and capillaries 400 such that the same peripheral distance is established between the support tubes 300 and the capillaries 400 (30 degree angle). Thus, a support tube 300 is arranged centrally between adjacent capillaries 400 in each case. After the alignment, the still-loose component parts are joined to one another with an adhesive compound for fixing their position.

The assembly 500 forms a primary preform and is subsequently stretched to form a secondary preform (often also referred to as "cane"). The sleeve tube 100 collapses partially, so that its inside 102 comes into contact with the support tubes 300 and they are fused to the inside 102 of the sleeve tube. The support tubes 300 are thereafter fused over their entire length both with the inside 102 of the sleeve tube (along an axial contact point 104) and with the outside of the ARE mother tube 200 (along an axial attachment point 204). Therefore, a laterally closed hollow channel is formed between adjacent support tubes 300, through which a single capillary 400 extends.

In the subsequent fiber drawing process, the secondary preform is softened in a zone-wise manner in a vertical orientation and is thereby further stretched and collapsed. A reduced pressure is here generated in the (stretched) support tubes 300, whereas an increased pressure is generated in the (stretched) capillaries 400 and in the hollow channels. The generation of reduced pressure or increased pressure occurs by connecting gas or vacuum lines at the upper end of the secondary preform. Regions which are not to be influenced by gas pressure or vacuum can also be closed. Increased pressure or reduced pressure are differential pressures relative to the respective surrounding region.

During the fiber drawing process, the six support tubes 300 collapse completely and thereby pull the attachment points 204 on the ARE mother tube 200 against the contact points 104 on the sleeve tube 100. The rest of the collapsed support tube 300 forms a small glass gob at the contact point 104. At the same time, the six hollow channels and the six capillaries 400 are inflated by the increased pressure. As a result, six arcuate anti-resonance elements of a first type 30 are formed from the previous ARE mother tube 200 with contact points to the respectively adjacent arcuate anti-resonance element 30. And the previous capillary 400 form nested anti-resonance elements of a second type 40.

In the anti-resonant hollow-core fiber 1 produced in this way, the previous support tubes (300) thus disappear, and the previous ARE mother tube (200) forms six anti-resonance elements of a first type 30, which are respectively of arcuate design in cross section as seen in the direction of the longitudinal axis of the fiber, with a left-hand arc end and with a right-hand arc end and with a bulge toward the hollow core 10, the arc ends of adjacent anti-resonance elements being fixed at the same axial contact point 104 of the previous sheath inside (23). Within the space enclosed by the anti-resonance elements of the first type 30, the previous capillary (400) are arranged as nested anti-resonance elements of the second type 40.

FIG. 3 schematically shows the sequence of the method for producing an anti-resonant hollow-core fiber with the Design 2. In the following, only the method differences compared to the production of Design 1 according to FIG. 2 will be explained:

- Instead of six, 12 structurally identical support tubes 300*a*, 330*b* made of quartz glass are used.
- The 12 support tubes 300*a*, 300*b* are thermally fixed in pairs at predetermined attachment points 204*a*; 204*b* of the outside of the ARE mother tube 200. The pairs of attachment points 204*a*; 204*b* are close to one another; the open distance between the support tubes 300*a*, 300*b* fixed there is approximately 1 mm. Apart from the paired arrangement, the support tubes 300*a*; 300*b* are evenly distributed around the outside of the ARE mother tube 200.
- During the stretching of the assembly 500 to the secondary preform, the sleeve tube 100 collapses partially, so that its inside 102 comes into contact with the support tubes 300*a*; 300*b*, and they are fused to the inside 102 of the sleeve tube. The support tubes 300*a*; 300*b* are thereafter fused over their entire length both with the inside 102 of the sleeve tube (along the axial contact points 104*a*, 104*b*) and with the outside of the ARE mother tube 200 (along the axial attachment points 204*a*; 204*b*). Therefore, a laterally closed, narrow hollow channel forms between the closely adjacent support tube pairs 300*a*; 300*b*. A further hollow channel forms between the adjacent support tubes 300*a*; 300*b* that are arranged further away from one another. A capillary 400 extends through each of the wide hollow channels.
- In the fiber drawing process, a reduced pressure is generated in the narrow hollow channels, whereas an increased pressure is generated in the (stretched) capillaries 400 and in the wide hollow channels. The 12 support tubes 300*a*; 300*b* completely collapse and thereby pull the attachment points 204*a*; 204*b* on the ARE mother tube 200 against the contact points 104*a*; 104*b* on the sleeve tube 100. The narrow hollow channels also collapse. At the same time, the six wide hollow channels and the six capillaries 400 are inflated by the increased pressure. As a result, six arcuate anti-resonance elements of a first type 30, which are not connected to one another, are formed from the previous ARE mother tube 200. The previous capillaries 400 form nested anti-resonance elements of a second type 40.

In the anti-resonant hollow-core fiber 2 produced in this way, the previous support tubes thus disappear, and the previous ARE-mother tube forms six anti-resonance elements of the first type 30, which are respectively of arcuate design in cross section as seen in the direction of the longitudinal axis of the fiber, with a left-hand arc end and with a right-hand arc end and with a bulge toward the hollow core 10, the arc ends of adjacent anti-resonance elements of the first type being fixed to adjacent axial contact points 104*a*; 104*b* of the previous sheath inside and not being connected to one another.

FIG. 4 schematically shows the sequence of the method for producing a hollow-core fiber with the Design 2A. In the following, only the method differences compared to the production of Design 2 will be explained:

- in the fiber drawing process, an increased pressure is generated in the narrow hollow channels, so that they do not collapse completely but are inflated in the direction of the hollow core 10 and form anti-resonant bridge elements 50 (anti-resonance elements of a third type) with negative curvature.

In the anti-resonant hollow-core fiber 2A thus produced, the previous support tubes (300) thus disappear and partially form small glass gobs in the region of the contact points 104*a*; 104*b* of the arc ends and a bridge element 50 arranged therebetween. The previous ARE mother tube (200) forms six anti-resonance elements of a first type, which are respectively of arcuate design in cross section as seen in the direction of the longitudinal axis of the fiber, with a left-hand arc end and with a right-hand arc end and with a bulge toward the hollow core 10, the arc ends of adjacent anti-resonance elements being fixed at adjacent axial contact points 104*a*; 104*b* of the previous sheath inside and not being connected to one another. The region between adjacent contact points 104*a*; 104*b* is filled by the bridge elements 50. The previous narrow cavities between the respective closely adjacent support tubes (300*a*; 300*b*) form anti-resonance elements of a third type, which are not nested, but which instead are evenly distributed, alternating with the anti-resonance elements of the first type 30, around the inside 23 of the sheath.

FIG. 5 schematically shows a second variant for the production of an anti-resonant hollow-core fiber with the Design 1. In the following, only the method differences compared to the production of Design 1 according to FIG. 2 will be explained:

- The six support tubes 300 are not bonded to attachment points 204 of the ARE mother tube, but rather at predetermined contact points 104 on the inside 102 of the sleeve tube 100. They are distributed evenly (at an angle of 60 degrees) around the sleeve tube inside 102 and alternate with the six capillaries 400, which are also bonded there, such that a support tube 300 is arranged centrally between adjacent capillaries 400.
- The ARE mother tube 200 is inserted into the inner bore 101 of the joining combination of sleeve tube 100, support tubes 300 and capillaries 400 to form the assembly 500. After the alignment, these component parts are connected to one another with an adhesive compound and fixed in their position.

The assembly 500 is stretched to form a secondary preform. The sleeve tube 100 collapses partially, so that the support tubes 300 fixed thereon come into contact with attachment points 204 on the outside of the ARE mother tube 200 and are fused therewith there. The support tubes 300 are thereafter fused over their entire length both with the inside 102 of the sleeve tube (along the axial contact point 104) and with the outside of the ARE mother tube 200 (along the axial attachment point 204).

In the fiber drawing process, six anti-resonance elements of the first type 30 are formed by reshaping of the ARE mother tube 200 and are respectively of arcuate design in cross section as seen in the direction of the longitudinal axis, with a left-hand arc end and with a right-hand arc end and with a bulge toward the hollow core 10, the arc ends of adjacent anti-resonance elements of the first type 30 being fixed at the same axial contact point 104 of the previous inside of the sheath. The previous capillaries 400 form nested anti-resonance elements of a second type 40.

FIG. 6 schematically shows a method sequence for producing an anti-resonant hollow-core fiber with the Design 4. The following cylindrical components are provided for this purpose:

(i) a thick-walled sleeve tube 100 ("jacket tube") made of quartz glass and comprising an inner bore 101 of the sleeve tube and a longitudinal axis of the sleeve tube along which a sleeve tube wall 103 bounded by an inside 102 of the sleeve tube and an outside extends. The sleeve tube 100 has an internal diameter $d_H$ of 25 mm and an external diameter of 90 mm.

(ii) a first, outer anti-resonance element mother tube 200 (first ARE mother tube remote from the hollow core) made of quartz glass and which has a mother tube inner bore 201 and a mother tube longitudinal axis along which a mother tube wall bounded by an inside and an outside extends. The first, outer ARE mother tube 200 has an external diameter of 20 mm and an internal diameter of 19 mm.

(iii) a second, inner anti-resonance element mother tube 600 (second ARE mother tube near the hollow core) made of quartz glass which has a mother tube inner bore 601 and a mother tube longitudinal axis along which a mother tube wall bounded by an inside and an outside extends. The second, interior ARE mother tube 600 has an external diameter of 14 mm and an internal diameter of 12.5 mm.

(iv) twelve structurally identical support tubes 300 made of quartz glass, each of which has an external diameter of 2.5 mm and a wall thickness of 0.35 mm.

These cylindrical components (100; 200; 300, 600) are joined to form a component assembly 500. For this purpose, six support tubes 300 are respectively thermally fixed at predetermined attachment points 204 of the outside of the first ARE mother tube 200 and at predetermined attachment points 604 of the outside of the second ARE mother tube 600 so that the longitudinal axes of all tubes (200, 600, 300) run parallel to one another, and the support tubes 300 are distributed evenly (at an angle of 60 degrees) around the outsides of the ARE mother tubes 200; 600.

The first joining combination of the first ARE mother tube 200 and six support tubes 300 and the second joining combination of the second ARE mother tube 600 and six further support tubes 300 is inserted into the inner bore 101 of the sleeve tube 100 such that the support tubes 300 of the first and second ARE mother tube (200; 600) are situated in pairs on a common radial line on which the predetermined contact points 104 are also located on the inside 102 of the sleeve tube.

The assembly 500 forms a primary preform and is subsequently stretched to form a secondary preform ("cane"). The sleeve tube 100 collapses partially, so that its inside 102 comes into contact with the support tubes 300 of the first joining combination and is fused to the inside 102 of the sleeve tube. In addition, the first, outer ARE mother tube 200 collapses partially, so that its inside comes into contact with the support tubes 300 of the second joining combination and these support tubes are fused to the inside of the first ARE mother tube 200.

All support tubes 300 are thereafter fused over their entire length both with the inside 102 of the sleeve tube (along an axial contact point 104) and with the outside of its respective ARE mother tube 200; 600 (along the original axial attachment points 204; 604). Therefore, a laterally closed hollow channel 502*a*; 502*b* is formed between adjacent support tubes 300, namely in two adjacent coaxial rows 501*a*; 501*b*, i.e., altogether 2×6 hollow channels.

In the subsequent fiber drawing process, the secondary preform is softened in a zone-wise manner in a vertical orientation and is thereby further stretched and collapsed. A reduced pressure is generated in the (stretched) support tubes 300, whereas an increased pressure is generated in the hollow channels 502*a*; 502*b*. Reduced pressure or increased pressure is generated by connecting gas or vacuum lines at the upper end of the secondary preform 500. Regions which are not to be influenced by gas pressure or vacuum may also be closed at the end face.

During the fiber drawing process, the twelve support tubes 300 collapse completely and thereby pull the attachment points 204; 604 on the ARE mother tubes 200; 600 against the contact points 104 on the sleeve tube 100 or in the direction of these contact points 104. At the same time, the twelve hollow channels 502*a*; 502*b* are inflated by the increased pressure. As a result, two rows of six interconnected arcuate anti-resonance elements 30, which are designed as double arcs 33*a*, 33*b*, are formed from the previous ARE mother tubes 200; 600. The double arcs 33*a*, 33*b* have different radii and common attachment points 32 on the fiber sheath. Their arc apexes and the respective attachment point 32 lie on the same radial line. The radius of curvature of the inner arc 33*b* is about 19 μm, and that of the outer arc 33*a* is about 33 μm.

In the anti-resonant hollow-core fiber 4 produced in this way, the previous support tubes (300) thus disappear, and the two previous ARE mother tubes (200; 600) form 12 anti-resonance elements evenly distributed around the inside 23 of the sheath as double arcs 33*a*; 33*b* in two coaxial rows. The double arcs 33*a* each have a common left arc end and a common right-hand arc end, the arc ends of adjacent anti-resonance elements being fixed at the same axial contact point 32 of the inside 23 of the sheath.

In the exemplary embodiments explained above, all constituents of the anti-resonant hollow-core fibers consist of undoped quartz glass. The invention is also readily executable with constituents made of other materials, in particular of other glasses or of plastics which are transparent to the operating wavelength. For example, the viscosity of quartz glass can be reduced or increased by adding dopants. Dopants used to lower the viscosity of quartz glass are preferably fluorine, chlorine and/or hydroxyl groups. $Al_2O_3$, $TiO_2$ and/or nitrogen come into consideration as dopants increasing the viscosity of quartz glass. Depending on their thermal stress during the fiber drawing process or the intricacy thereof, individual fiber constituents may contain a dopant that lowers the viscosity of quartz glass or increases the viscosity of quartz glass.

The invention claimed is:

1. An anti-resonant optical component, which comprises a hollow core extending along a component longitudinal axis, a sheath surrounding the hollow core with a circumferential inner side facing the hollow core and anti-resonance elements of a first type, each of which are respectively of arcuate design in cross section as seen in the direction of the longitudinal axis of the component, with a left-hand arc end and with a right-hand arc end and with a bulge toward the hollow core, the arc ends being connected to the inside of the sheath at contact points and, together with the inside of the sheath, spanning a curvature surface, wherein a second type of anti-resonance elements is provided, anti-resonance elements of the second type being nested with anti-resonance elements of the first type in the sense that, in the cross section as seen in the direction of the component longitudinal axis, at least one anti-resonance element of the second type is arranged within a curvature interior space bounded by the curvature surface, and wherein the nested anti-resonance elements of the second type are in each case circular or oval in cross section as seen in the direction of the component longitudinal axis.

2. The optical component according to claim 1, wherein the nested anti-resonance elements of the second type are each connected to the inside of the sheath.

3. The optical component according to claim 1, wherein the nested anti-resonance elements of the second type each have no contact with the arcuate anti-resonance element of the first type.

4. The optical component according to claim 1, wherein at least four anti-resonance elements of the first type are distributed evenly around the inside of the sheath, the arc ends of adjacent anti-resonance elements of the first type being in contact with one another.

5. The optical component according to claim 1, wherein at least four anti-resonance elements of the first type are distributed evenly around the inside of the sheath, the arc ends of adjacent anti-resonance elements of the first type not having any contact with one another.

6. The optical component according to claim 5, wherein anti-resonance elements of a third type are provided, in each case at least one anti-resonance element of the third type being arranged between adjacent anti-resonance elements of the first type, said anti-resonance element being connected to the adjacent anti-resonance elements of the first type and to the inside of the sheath.

7. The optical component according to claim 1, wherein the anti-resonance elements of the first type in cross section as seen in the direction of the component longitudinal axis are formed in the shape of an inner arc and a nested outer arc, each having a left-hand arc end and a right-hand arc end and having a bulge toward the hollow core, the left-hand arc ends of the nested outer arc and of the inner arc each being connected to one another, and the right-hand arc ends of the nested outer arc and of the inner arc each being connected to one another.

* * * * *